US009012525B2

(12) United States Patent
Kouno et al.

(10) Patent No.: US 9,012,525 B2
(45) Date of Patent: Apr. 21, 2015

(54) TIRE PROCESSING METHOD AND TIRE PROCESSING DEVICE

(75) Inventors: Yoshihide Kouno, Kodaira (JP); Seiji Kon, Kodaira (JP); Keiichi Hasegawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 28 days.

(21) Appl. No.: 13/817,735

(22) PCT Filed: Aug. 12, 2011

(86) PCT No.: PCT/JP2011/068472
§ 371 (c)(1),
(2), (4) Date: Feb. 19, 2013

(87) PCT Pub. No.: WO2012/023523
PCT Pub. Date: Feb. 23, 2012

(65) Prior Publication Data
US 2013/0150467 A1 Jun. 13, 2013

(30) Foreign Application Priority Data
Aug. 20, 2010 (JP) ................. 2010-185649

(51) Int. Cl.
*C08J 11/04* (2006.01)
*C08J 11/12* (2006.01)
*B29B 17/02* (2006.01)
*B60C 5/01* (2006.01)
(Continued)

(52) U.S. Cl.
CPC ............. *C08J 11/12* (2013.01); *B29B 17/0206* (2013.01); *B29L 2030/00* (2013.01); *B60C 5/01* (2013.01); *B29B 13/023* (2013.01); *B29D 30/0005* (2013.01); *B29D 30/0678* (2013.01); *B29D 30/1628* (2013.01)

(58) Field of Classification Search
CPC . C08J 11/12; B29B 17/0206; B29D 30/0005; B29D 30/0678; B29D 30/1628; B20B 13/023
USPC ............ 521/40, 41, 46, 48, 49; 422/255, 285
See application file for complete search history.

(56) References Cited

U.S. PATENT DOCUMENTS

2011/0056603 A1 * 3/2011 Koutoku et al. ............. 152/450

FOREIGN PATENT DOCUMENTS

| CN | 1148003 A | 4/1997 |
| CN | 101015946 A | 8/2007 |

(Continued)

OTHER PUBLICATIONS

Office translation of JP 2004 223801.*
(Continued)

*Primary Examiner* — Frances Tischler
(74) *Attorney, Agent, or Firm* — Sughrue Mion, PLLC

(57) ABSTRACT

In a tire constituted with a thermoplastic material and a material different from the thermoplastic material, the thermoplastic material and the material different from the thermoplastic material are easily and efficiently separated. While a tire 10 formed of a thermoplastic material is being turned, heated air is ejected from a nozzle 46 of a heating apparatus 44, and the surface of a crown portion 16 is melted. An end portion of a cord 26 embedded in a helical arrangement, which is formed of a material different from the thermoplastic material, is extracted from the melted region, and is sequentially wound onto a reel 58.

1 Claim, 4 Drawing Sheets

(51) Int. Cl.
    *B29B 13/02*     (2006.01)
    *B29D 30/00*     (2006.01)
    *B29D 30/06*     (2006.01)
    *B29D 30/16*     (2006.01)
    *B29L 30/00*     (2006.01)

(56) References Cited

FOREIGN PATENT DOCUMENTS

| | | |
|---|---|---|
| DE | 10 2009 056 633 A1 | 6/2010 |
| JP | 52-114681 A | 9/1977 |
| JP | 60-203411 A | 10/1985 |
| JP | 3-143701 A | 6/1991 |
| JP | 6-155472 A | 6/1994 |
| JP | 11-114876 A | 4/1999 |
| JP | 2002-282117 A | 10/2002 |
| JP | 2004-223801 A | 8/2004 |
| JP | 2004-230860 A | 8/2004 |
| JP | 2006-27224 A | 2/2006 |
| JP | 2008-189252 A | 8/2008 |
| JP | 2009-274682 A | 11/2009 |

OTHER PUBLICATIONS

Japanese Office Action, dated Jan. 14, 2014, issued in corresponding Japanese Patent Application No. 2010-185649.
Partial translation of Japanese Patent Application Laid-Open (JP-A) No. 52-114681 dated Sep. 26, 1977.
International Search Report for PCT/JP2011/068472 dated Oct. 25, 2011.
Extended European Search Report, dated Jun. 3, 2014, issued in corresponding European Patent Application No. 11818165.0.
Chinese Office Action, dated Jun. 5, 2014, issued in Chinese Patent Application No. 201180040173.0.

\* cited by examiner

TIRE PROCESSING METHOD AND TIRE PROCESSING DEVICE

CROSS REFERENCE TO RELATED APPLICATIONS

This application is a National Stage of International Application No. PCT/JP2011/068472 filed Aug. 12, 2011, claiming priority based on Japanese Patent Application No. 2010-185649 filed Aug. 20, 2010, the contents of all of which are incorporated herein by reference in their entirety.

TECHNICAL FIELD

The present invention relates to a tire processing method and a tire processing device, and particularly relates to a tire processing method and tire processing device that enable efficient separation of a thermoplastic material from a tire constituted with the thermoplastic material.

BACKGROUND ART

Recently, a pneumatic tire in which a carcass portion of the tire is formed of a thermoplastic material instead of rubber has been proposed (for example, see Patent Document 1) as a pneumatic tire to be used on a vehicle. When the carcass portion of a tire is formed of a thermoplastic material, fabrication may be easier compared to a related art tire made of vulcanized rubber.

When a related art pneumatic tire made of rubber is disposed of, separating the waste tire into rubber and reinforcement materials (belts, beads, plys and the like) is difficult. Hence, there are problems with recycling in regard to labor and costs. A technology disclosed in Patent Document 2 is an example of processing of a related art rubber tire.

Patent Document 1: Japanese Patent Application Laid-Open (JP-A) No. H03-143701
Patent Document 2: JP-A No. H11-114876

DISCLOSURE OF INVENTION

Technical Problem

In contrast to vulcanized rubber, thermoplastic materials are easy to recycle and have many applications. Accordingly, with a pneumatic tire that is formed with a thermoplastic material, a method for separating the materials, such as, for example, separating the tire into the thermoplastic material and materials other than the thermoplastic material, is sought. However, for pneumatic tires constituted with thermoplastic materials, there have not heretofore been a processing method and device that efficiently separate out a thermoplastic material.

The present invention has been made in order to solve the problem described above, and an object of the invention is to provide a tire processing method and tire processing device that enable efficient separation of a thermoplastic material from a tire that is constituted with the thermoplastic material.

Solution to Problem

A tire processing method according to a first aspect of the present invention includes: a first step of, at a tire that is constituted with a thermoplastic material and a material other than the thermoplastic material, heating a portion of the thermoplastic material and either melting or softening the portion; and a second step of, at a melted or softened portion of the thermoplastic material, separating the melted or softened thermoplastic material and the material other than the thermoplastic material.

Now, the tire processing method according to the first aspect is described.

Firstly, in the first step, a portion of the thermoplastic material constituting the tire is heated, and the heated portion is softened or melted.

In the second step, the material other than the thermoplastic material is separated at a softened or melted region of the thermoplastic material. Because the portion of the thermoplastic material is softened or melted, the material other than the thermoplastic material may be easily detached from the softened or melted region of the thermoplastic material, and the thermoplastic material may be efficiently separated.

In the first step, it is sufficient to heat a region at which a material other than the thermoplastic material is disposed inside a region formed of the thermoplastic material, that is, to heat the thermoplastic material of a portion of the whole tire. There is no need to heat the whole tire and soften or melt all the thermoplastic material. Therefore, large-scale equipment such as a heating oven in which the whole tire is placed and heated or the like is not necessary, and the energy required for heating is kept to a minimum.

Materials other than the thermoplastic material may include, for example, thermosetting materials, vulcanized rubber, metals, inorganic materials and so forth, and may further include other materials.

A tire processing method according to a second aspect of the present invention includes a first step of, at a tire that is constituted with a plurality of thermoplastic materials having different melting points and with a material other than the thermoplastic materials, heating some of the plurality of thermoplastic materials; and a second step of separating a portion of a thermoplastic material that is either melted or softened and a thermoplastic material that is neither melted nor softened.

Now, the tire processing method according to the second aspect is described.

Firstly, in the first step, a portion of the thermoplastic materials constituting the tire is heated, and the heated portion is softened or melted. In the first step, it is sufficient if the vicinity of a boundary between the thermoplastic materials having different melting points is heated enough to soften or melt a thermoplastic material having a lower melting point, such that a thermoplastic material having a higher melting point is not softened or melted.

In the second step, at a melted or softened region of the thermoplastic materials, the melted or softened thermoplastic material and the thermoplastic material that is not melted or softened are separated. Because a portion of the thermoplastic material having the lower melting point is softened or melted, the softened or melted thermoplastic material and the thermoplastic material having the higher melting point that is not softened or melted may be easily separated at the softened or melted region of the thermoplastic material. Thus, in the tire processing method according to the second aspect, the difference in the melting points of the thermoplastic materials may be utilized to easily separate the thermoplastic materials having different melting points.

In the tire processing method according to the second aspect, it is sufficient to heat a portion of the thermoplastic material and there is no need to heat the whole tire. Therefore, large-scale equipment such as a heating oven in which the whole tire is placed and heated or the like is not necessary, and the energy required for heating is kept to a minimum.

When thermoplastic materials and a material different from the thermoplastic materials are to be separated, for example, the thermoplastic materials with different melting points are separated, and then a portion of the remaining thermoplastic material containing the material different from the thermoplastic materials is melted or softened. Thus, the softened or melted thermoplastic material may be easily separated from the material other than the thermoplastic material at the softened or melted region of the thermoplastic material.

In a tire processing method according to a third aspect of the present invention, in the tire processing method according to the first aspect or the second aspect, a tire carcass portion of the tire extends from one bead portion to another bead portion, the tire carcass portion being formed of the thermoplastic material, and a reinforcement layer is provided at an outer periphery portion of the tire carcass portion, the reinforcement layer including a cord formed of the material other than the thermoplastic material, the first step includes heating and either melting or softening the outer periphery portion of the tire carcass portion, and the second step includes drawing out the cord from the melted or softened portion of the thermoplastic material.

Now, the tire processing method according to the third aspect is described.

In the first step, the outer periphery portion of the tire carcass portion is heated, and softened or melted. In the second step, the cord is drawn out from softened or melted regions of the thermoplastic material. Thus, the tire carcass portion formed of the thermoplastic material and the cord formed of a material other than the thermoplastic material may be easily separated.

In a tire processing method according to a fourth aspect of the present invention, in the tire processing method according to the third aspect, the cord is provided in a helical arrangement at the outer periphery of the tire carcass portion, the first step includes sequentially melting the outer periphery portion of the tire carcass portion while the tire is being turned, and the second step includes winding up the cord while drawing out the cord from melted portions of the thermoplastic material while the tire is being turned.

Now, the tire processing method according to the fourth aspect is described.

In the first step, while the tire is being turned, the outer periphery portion of the tire carcass portion is sequentially softened or melted. In the second step, while the tire is being turned, the cord is wound up while being drawn out from softened or melted regions of the thermoplastic material. When the cord is provided in a helical arrangement at the outer periphery of the tire carcass portion, the cord may be efficiently recovered by this first step and second step.

In a tire processing method according to a fifth aspect, in the tire processing method according to any one of the first to fourth aspects, the first step includes directing hot air onto and either melting or softening the thermoplastic material.

Now, the tire processing method according to the fifth aspect is described.

In the first step, the heated air is directed onto the thermoplastic material and the thermoplastic material is softened or melted. The heated air is locally applied and softens or melts the thermoplastic material only at necessary regions that should be softened or melted. Thus, the energy required for heating is kept to a minimum.

A tire processing device according to a sixth aspect includes: a tire supporter that turnably supports a tire constituted with a thermoplastic material and a material other than the thermoplastic material; a heater that heats and either melts and softens at least a portion of the thermoplastic material constituting the tire; and a separator that separates the thermoplastic material and the material other than the thermoplastic material at a portion of the thermoplastic material that is either melted or softened.

Now, the tire processing device according to the sixth aspect is described.

First of all, the tire to be processed is turnably supported at the tire supporter.

Then the thermoplastic material in a region at which the material other than the thermoplastic material is adhered or embedded is heated by the heater and softened or melted.

After the thermoplastic material around the material other than the thermoplastic material is softened or melted, the separator is used to separate the thermoplastic material from the material other than the thermoplastic material at softened or melted regions of the thermoplastic material.

If the material other than the thermoplastic material is, for example, a cord provided in a helical arrangement at a tire outer periphery portion, the tire outer periphery portion may be softened or melted by the heater while the tire is being turned. While the tire is being turned, the cord may be wound up while being drawn out from the softened or melted portion of the thermoplastic material. Thus, the thermoplastic material and the cord formed of the material other than the thermoplastic material may be efficiently and easily separated.

A tire processing device according to a seventh aspect of the present invention includes: a tire supporter that turnably supports a tire constituted with a plurality of thermoplastic materials having different melting points and with a material other than the thermoplastic materials; a heater that heats at least some of the plurality of thermoplastic materials constituting the tire; and a separator that separates a portion of a thermoplastic material that is either melted or softened and a thermoplastic material that is neither melted nor softened.

Now, the tire processing device according to the seventh aspect is described.

First of all, the tire to be processed is turnably supported at the tire supporter.

Then, for example, a thermoplastic material in a region in which the thermoplastic materials having different melting points are joined to one another is heated by the heater and softened or melted.

After the thermoplastic material is softened or melted, the separator may be used to easily separate the softened or melted thermoplastic material from the thermoplastic material that is not softened or melted, at softened or melted regions of the thermoplastic material.

Advantageous Effects of Invention

According to the tire processing method in accordance with the first aspect as described above, a tire constituted with a thermoplastic material and a material other than a thermoplastic material may be efficiently and easily separated into the thermoplastic material and the material other than the thermoplastic material.

According to the tire processing method in accordance with the second aspect, a tire constituted with thermoplastic materials having different melting points, may be efficiently and easily separated into the different thermoplastic materials having different melting points.

According to the tire processing method in accordance with the third aspect, a tire carcass portion and a cord may be efficiently separated.

According to the tire processing method in accordance with the fourth aspect, a cord may be efficiently recovered.

According to the tire processing method in accordance with the fifth aspect, because the heated air is directed onto and softens or melts only a necessary region at which the thermoplastic material should be softened or melted, the energy required for heating is kept to a minimum.

According to the tire processing device in accordance with the sixth aspect, a tire may be easily and efficiently separated into a thermoplastic material and a material other than a thermoplastic material.

According to the tire processing device in accordance with the seventh aspect, a tire may be easily and efficiently separated into different thermoplastic materials having different melting points.

BEST MODE FOR CARRYING OUT THE INVENTION

Herebelow, the tire processing method and tire processing device of the present invention are described in accordance with the attached drawings.

Figure 2:
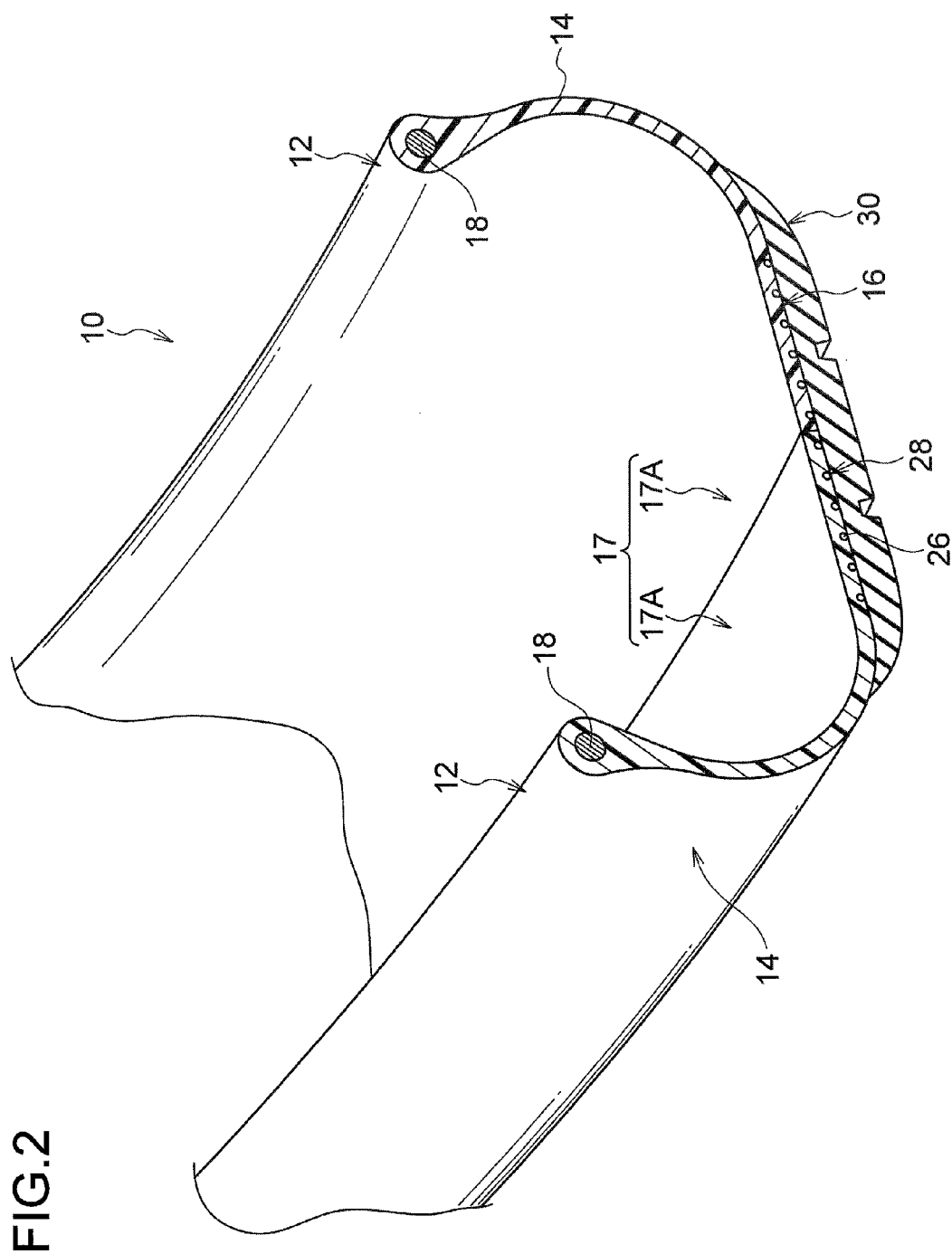
FIG. 2 is a perspective view in which a portion of a tire is shown in cross section.

FIG. 2 shows a tire 10 of which a tire carcass portion is constituted of a thermoplastic material. The tire 10 of the present exemplary embodiment has substantially the same cross-sectional form as an ordinary related art pneumatic tire made of rubber.

The tire 10 is provided with a tire case 17 formed of a pair of bead portions 12, side portions 14 and a crown portion 16. The bead portions 12 make contact with bead seat portions and rim flanges of rims, which are not shown in the drawings. The side portions 14 extend to the outer side in the tire radial direction from the bead portions 12. The crown portion 16 links the tire radial direction outer side end of one side portion 14 with the tire radial direction outer side end of the other side portion 14. This tire case 17 corresponds to a tire carcass portion of the present invention.

The tire case 17 of the present exemplary embodiment is formed of a thermoplastic material.

The tire case 17 is formed by annular tire half-bodies 17A with the same form, in which one of the bead portions 12, one of the side portions 14, and half the width of the crown portion 16 are formed as a single body by molding or the like, being mated with one another and joined by welding or the like at a tire equator surface portion. The tire case 17 is not limited to a form in which two members are joined, and may be formed by joining three or more members. The pair of bead portions 12, the pair of side portions 14 and the crown portion 16 may be formed as a single body.

For the thermoplastic material, a thermoplastic resin with resilience such as a rubber or the like, a thermoplastic elastomer (TPE), or the like may be used. It is preferable to use a thermoplastic elastomer in consideration of the resilience required during running, molding characteristics at the time of fabrication and suchlike.

Examples of thermoplastic elastomers include amide-based thermoplastic elastomers (TPA), ester-based thermoplastic elastomers (TPC), olefin-based thermoplastic elastomers (TPO), styrene-based thermoplastic elastomers (TPS), urethane-based thermoplastic elastomers (TPU) and thermoplastic cross-linked rubbers (TPV), which are defined in JIS K6418, and other thermoplastic elastomers (TPZ) and the like.

Further examples of thermoplastic materials include urethane resins, olefin resins, vinyl chloride resins, polyamide resins and so forth.

The thermoplastic material may further be a material other than the above-mentioned thermoplastic resins and thermoplastic elastomers.

Each tire half-body 17A formed of a thermoplastic material may be formed by, for example, vacuum molding, pressure molding, injection molding, melt-casting or the like. Thus, compared to molding of rubber (vulcanization), fabrication steps may be greatly simplified and a molding duration is kept short.

In the present exemplary embodiment, the tire half-bodies 17A have shapes with left-right symmetry. That is, one tire half-body 17A and the other tire half-body 17A have the same shapes. Thus, there is an advantage in that only one kind of mold is required for molding the tire half-bodies 17A.

Similarly to an ordinary related art pneumatic tire, an annular bead core 18 formed of steel cord is embedded in each bead portion 12 of the present exemplary embodiment. However, the bead core 18 may be omitted provided stiffness of the bead portion 12 can be assured and there is no problem with the bead portion 12 fitting to a rim 20. The bead core 18 may be formed of a cord other than steel cord, such as an organic fiber cord or the like. The bead core 18 of the present exemplary embodiment corresponds to a material that is different from a thermoplastic material in the present invention.

A crown portion reinforcement layer 28, which is formed of a cord 26 of steel wound in a helical arrangement, is embedded in the crown portion 16 of the tire case 17. The whole of the cord 26 may be embedded in the crown portion 16, or a portion of the cord 26 may be embedded in the crown portion 16. This crown portion reinforcement layer 28 corresponds to a belt disposed at the outer periphery face of a carcass of a related art pneumatic tire made of rubber. The cord 26 of the present exemplary embodiment corresponds to the material that is different from a thermoplastic material in the present invention. The crown portion reinforcement layer 28 may be formed from steel cords that are angled with respect to the tire circumferential direction.

A tread rubber layer 30 formed of a rubber, which is more excellent in wear resistance than the thermoplastic material, is disposed at the outer periphery side of the crown portion reinforcement layer 28. For the rubber used in the tread rubber layer 30, it is preferable to use a rubber of the same type as a rubber that is used in related art pneumatic tires made of rubber. However, a tread layer that is formed of a thermoplastic material of a different type that has more excellent wear resistance than the thermoplastic material forming the side portions 14 may be provided at the outer periphery portion of the crown portion reinforcement layer 28. The tread rubber layer 30 of the present exemplary embodiment corresponds to the material that is different from a thermoplastic material in the present invention.

—Tire Processing Device—

Now, a tire processing device 32 that processes the tire 10 of the present exemplary embodiment is described.

Figure 1:
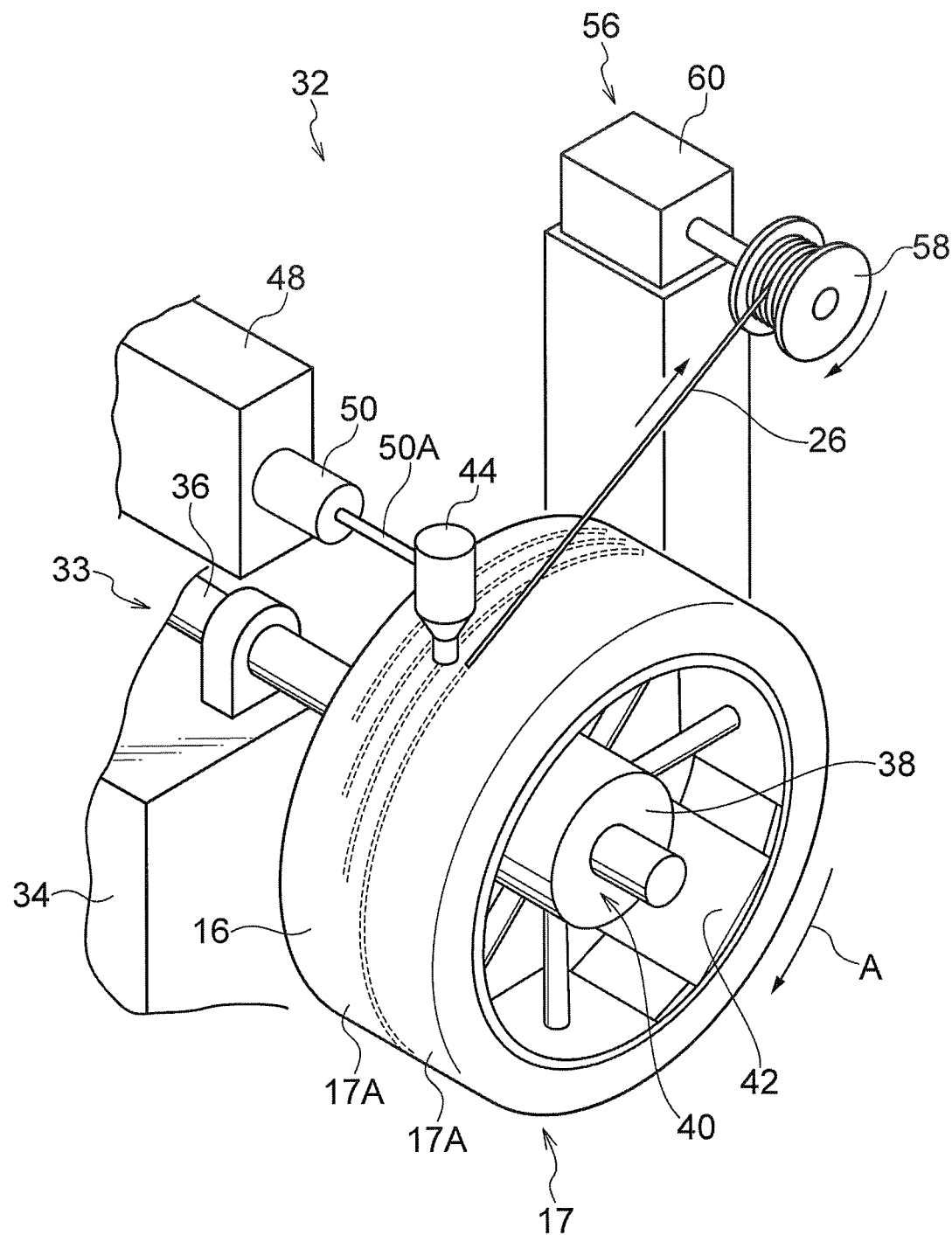
FIG. 1 is a perspective view of a tire processing device.

FIG. 1 shows a perspective view of principal portions of the tire processing device 32 that is used when forming the tire 10. The tire processing device 32 is provided with a tire support apparatus 33. A pedestal 34 of the tire support apparatus 33 is set on a floor surface. A shaft 36, which is disposed horizontally, is turnably supported at an upper portion of the pedestal 34. The shaft 36 is turned by a motor, which is not shown in the drawings.

Figure 3A:
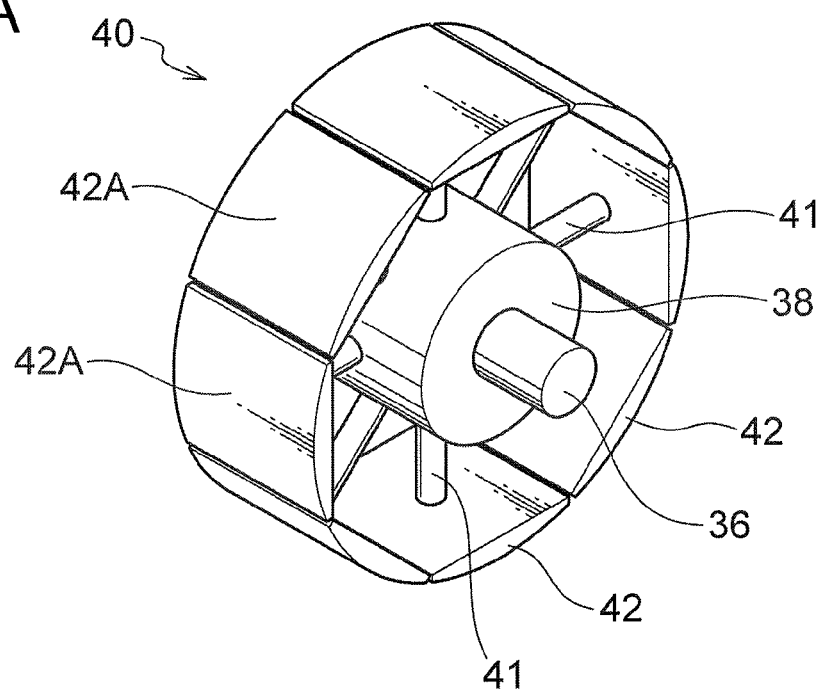
FIG. 3A is a perspective view of a tire support portion set to a minimum diameter.
Figure 3B:
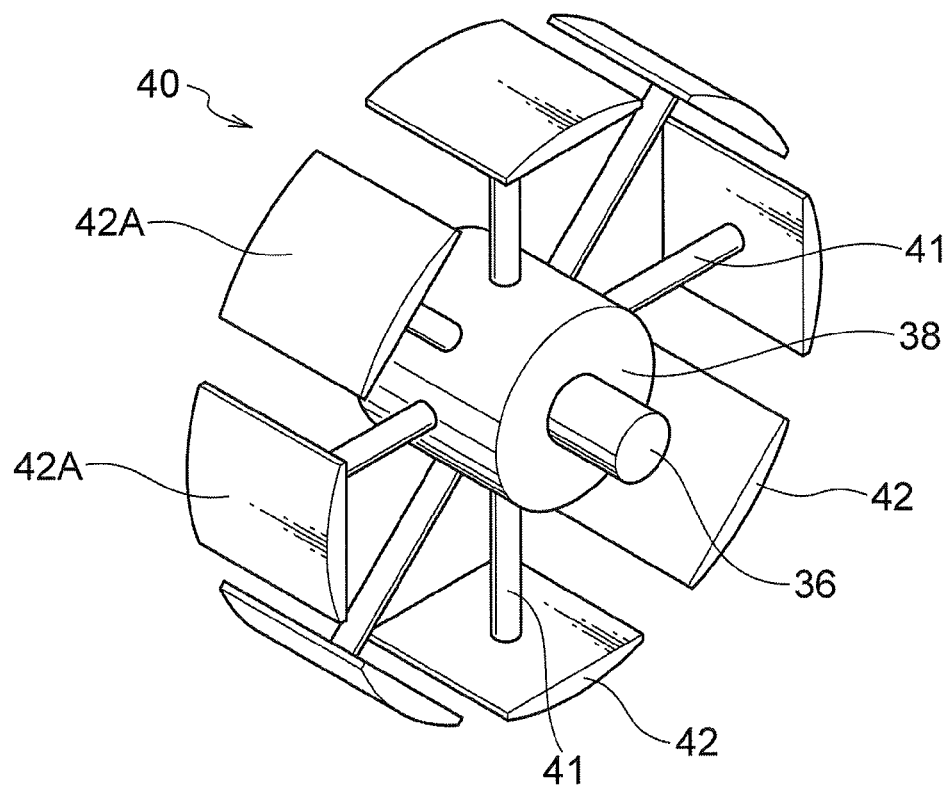
FIG. 3B is a perspective view of the tire support portion set to a maximum diameter.

As shown in FIG. 1, FIG. 3A and FIG. 3B, a tire support portion 40 is provided at an end portion side of the shaft 36. The tire support portion 40 is provided with a cylinder block 38, which is fixed to the shaft 36. A plural number of cylinder rods 41, which extend to the radial direction outer side, are provided at the cylinder block 38, at equal intervals in the circumferential direction thereof.

Tire support plates 42 are provided at distal ends of the cylinder rods 41. The tire support plates 42 include circular arc faces 42A, which are specified such that the outer faces have substantially the same radius of curvature as an inner face of the tire.

FIG. 3A shows a state in which protrusion amounts of the cylinder rods 41 are at a minimum (the tire support portion 40 is in a minimum diameter state), and FIG. 3B shows a state in which the protrusion amounts of the cylinder rods 41 are at a maximum (the tire support portion 40 is in a maximum diameter state). The cylinder rods 41 are movable by equal amounts in the same direction in conjunction with one another.

Figure 4:
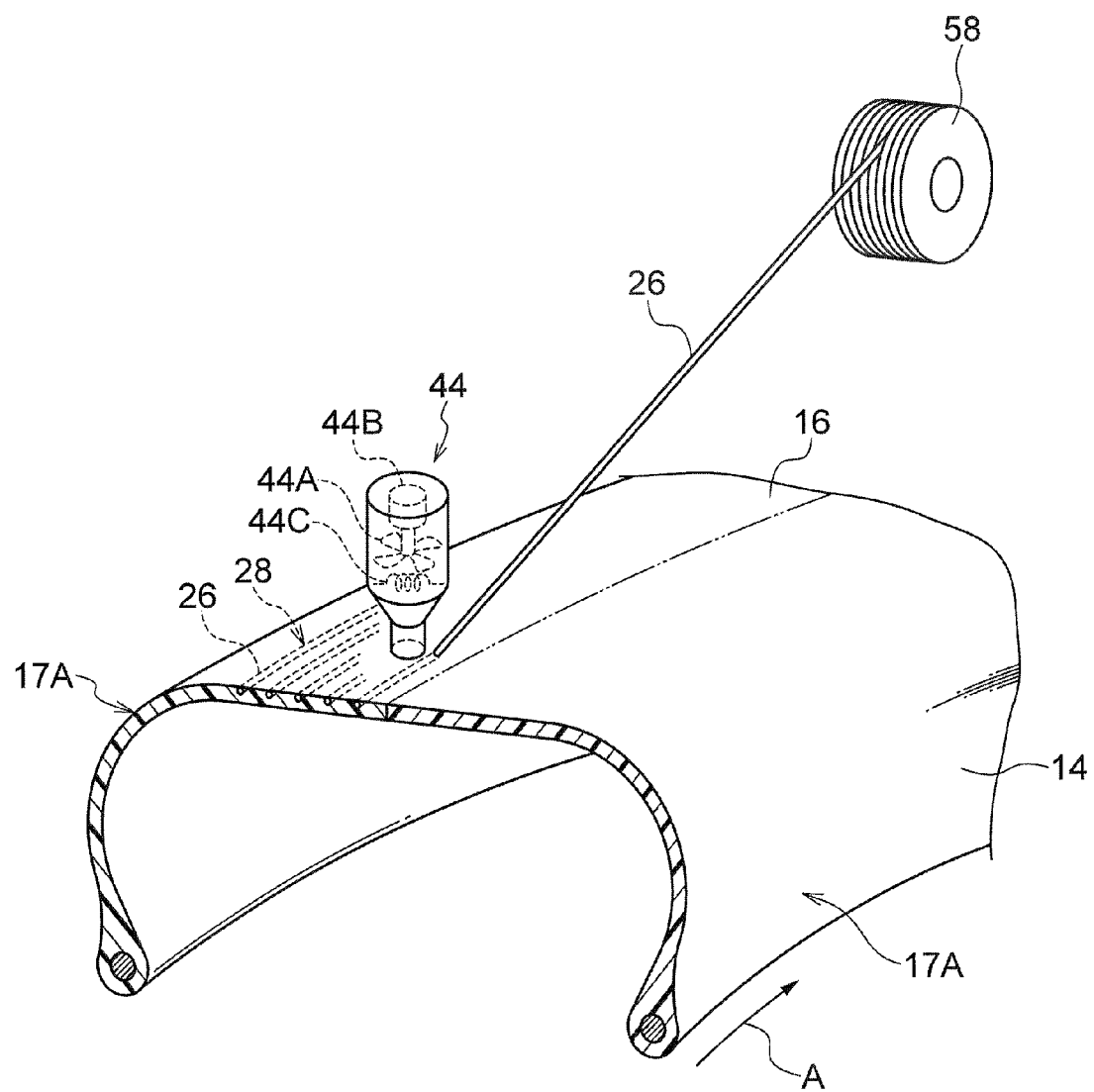
FIG. 4 is a magnified perspective view of a heating apparatus vicinity.

As shown in FIG. 1, a heating apparatus 44 that ejects heated air is disposed in the vicinity of the tire support apparatus 33. As shown in FIG. 4, the heating apparatus 44 incorporates thereinside a fan 44A, a motor 44B that turns the fan 44A, an electrothermic heater 44C and the like. A nozzle 46 that ejects the heated air toward the tire 10 is provided at a lower end of the heating apparatus 44.

As shown in FIG. 1, a support pillar 48 is mounted at an upper portion of the pedestal 34. A cylinder 50 is mounted by bolts or the like, not shown in the drawings, to a side face of the support pillar 48. An up-and-down position of the cylinder 50 is alterable. The cylinder 50 is disposed to be parallel with the shaft 36, and the heating apparatus 44 is mounted at the distal end of a cylinder rod 50A of the cylinder 50.

The tire processing device 32 is further provided with a cord winding apparatus 56. The cord winding apparatus 56 is equipped with a reel 58, round which the cord 26 is wound, and a motor 60 that turns the reel 58.

—Tire Processing Steps—

(1) First, the tire 10 is disposed at the outer periphery side of the tire support portion 40 whose diameter is reduced. Then, the diameter of the tire support portion 40 is increased, the plural tire support plates 42 make contact with the inner periphery face of the tire 10, and the tire 10 is supported from the inner side thereof by the plural tire support plates 42.

(2) Next, in the same manner as for an ordinary recycled tire, the tread rubber layer 30 is removed using a cutter, a buffer and the like.

(3) Then, the heating apparatus 44 is moved to the side of one or the other end portion in the width direction of the crown portion 16 of the tire 10. While the tire 10 is turned in the direction of arrow A, heated air is ejected from the nozzle 46, and the surface of the one width direction end portion of the crown portion 16 is melted (the first step of the present invention). An end portion of the cord 26 that has been embedded in a helical arrangement is extracted from a melted region, and this end portion of the cord 26 is engaged with the reel 58. Naturally, in order to melt a thermoplastic resin, the temperature of the region to be melted must be heated to at least the melting point of the thermoplastic resin.

(4) Hence, as shown in FIG. 1, while the tire 10 is being turned in the direction of arrow A, the heated air is ejected from the nozzle 46 and sequentially melts the surface of the crown portion 16 (the first step of the present invention). At the same time, because the reel 58 is being turned, the cord 26 is sequentially drawn out from melted regions and sequentially wound onto the reel 58 (the second step of the present invention).

In the tire processing device 32 of the present exemplary embodiment, because the cord 26 is embedded in a helical arrangement, the heating apparatus 44 is moved in the axial direction synchronously with the turning of the tire 10.

Thus, in the present exemplary embodiment, only necessary regions of the crown portion 16 of the tire case 17 are melted, and the cord 26 may be easily recovered from the tire case 17.

If the annular bead core 18 is to be recovered, it is sufficient to, for example, melt an outer face of the bead portion 12 with the heated air from the heating apparatus 44 (over one rotation), and extract the bead core 18 from the melted regions.

Hence, the tire case 17 from which all materials other than the thermoplastic material have been removed may be re-melted and recycled.

—Other Embodiments—

In the exemplary embodiment described above, the tire case 17 is melted by hot air. However, the present invention is not limited thus. Provided the thermoplastic material may be melted, a method of heating is not limited to hot air. For example, infrared radiation may be irradiated from a heater or the like to melt the tire case 17, or a laser beam (infrared radiation) may be irradiated from a laser light source to cause melting.

Further, a heating iron that is heated by a heater or the like may be touched against the thermoplastic material that is the tire case 17 and melt the surface thereof. Further yet, if the cord 26 is a metal such as steel or the like as in the present exemplary embodiment, the cord itself may be heated by electromagnetic induction heating (IH) or the like and melt the thermoplastic material surrounding the cord.

The tread rubber layer 30 may be extracted from the tire case 17 to an axial direction outer side if the tire 10 at which the tread rubber layer 30 is provided is disposed inside a coil, the cord 26 is heated by electromagnetic induction heating, and the thermoplastic resin at a region at the inner side of the tread rubber layer 30 (the crown portion 16 of the tire case 17) is melted. If the whole of the outer periphery face of the crown portion 16 of the tire case 17 is melted, the cord 26 in the helical arrangement may be bodily recovered to the axial direction outer side.

In the exemplary embodiment described above, the tire is structured to include the tire case 17 formed of a single thermoplastic material, the tread rubber layer 30 formed of rubber, the cord 26 formed of steel, and the bead cores 18 formed of steel. However, the tread rubber layer 30 may be replaced with, for example, a tread layer formed of a thermoplastic material with a different melting point from the tire case 17. Hence, regions of the tread may be heated, the thermoplastic material that has the lower melting point may be melted or softened, and the thermoplastic resin material with the lower melting point may be separated from the thermoplastic material with the higher melting point. Thus, the tire case 17 and the tread layer may be easily separated. The melting point of the thermoplastic material that constitutes the tread layer may be higher and may be lower than the melting point of the thermoplastic material that constitutes the tire case 17. In other words, it is sufficient that the respective melting points of the thermoplastic materials be different.

In the exemplary embodiment described above, the tire case 17 is formed of a single thermoplastic material. Plural members formed of thermoplastic materials with different melting points may be fused to constitute the tire case 17. In this case, if a vicinity of a boundary (a joining portion) between the thermoplastic materials with different melting points is heated and the thermoplastic material that has the lower melting point is melted or softened but the thermoplastic material with the higher melting point is not melted or softened, the thermoplastic material with the lower melting point and the thermoplastic material with the higher melting point may be easily separated.

In the exemplary embodiment described above, an example in which the cord 26 and the bead cores 18 are recovered is described. However, the material different from the thermoplastic material is not limited to the cord 26 and the bead cores 18, and may be anything that is a structural member of the tire, which may be a thermoplastic resin, organic fibers, vulcanized rubber, an inorganic material or the like, regardless of the properties of the material.

In the exemplary embodiment described above, the thermoplastic material is melted when the cord 26 is being recovered. However, provided a large force is not required for taking out the cord 26, the thermoplastic material in a region from which the cord 26 is being extracted may be in a softened state, depending on the circumstances. Similarly, when materials at other portions are being separated, melting the thermoplastic material is not necessarily required and, depending on the circumstances, a softened state may be sufficient.

The invention claimed is:

1. A tire processing method comprising:
   a first step of, at a tire that is constituted with a thermoplastic material and a material other than the thermoplastic material, heating a portion of the thermoplastic material and either melting or softening the portion; and
   a second step of, at a melted or softened portion of the thermoplastic material, separating the melted or softened thermoplastic material and the material other than the thermoplastic material,
   wherein a tire carcass portion of the tire extends from one bead portion to another bead portion, the tire carcass portion being formed of the thermoplastic material, and a reinforcement layer is provided at an outer periphery portion of the tire carcass portion, the reinforcement layer including a cord formed of the material other than the thermoplastic material,
   the first step includes heating and either melting or softening the outer periphery portion of the tire carcass portion, and
   the second step includes drawing out the cord from the melted or softened portion of the thermoplastic material,
   wherein the cord is provided in a helical arrangement at the outer periphery of the tire carcass portion,
   the first step includes sequentially melting the outer periphery portion of the tire carcass portion while the tire is being turned, and
   the second step includes winding up the cord while drawing out the cord from melted portions of the thermoplastic material while the tire is being turned, and in the second step, the cord is wound up sequentially from one end portion of the cord, and
   wherein the first step includes directing hot air onto, and either melting or softening, the thermoplastic material.

* * * * *